(12) United States Patent
Noh et al.

(10) Patent No.: US 8,978,470 B2
(45) Date of Patent: Mar. 17, 2015

(54) INERTIAL SENSOR

(75) Inventors: Jung Eun Noh, Gyunggi-do (KR); Seung Heon Han, Seoul (KR); Jong Woon Kim, Seoul (KR); Jun Lim, Gyunggi-do (KR); Seung Hun Han, Gyunggi-do (KR); Min Kyu Choi, Incheon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 270 days.

(21) Appl. No.: 13/438,361

(22) Filed: Apr. 3, 2012

(65) Prior Publication Data

US 2013/0152683 A1 Jun. 20, 2013

(30) Foreign Application Priority Data

Dec. 20, 2011 (KR) .................. 10-2011-0138338

(51) Int. Cl.
  *G01P 15/08* (2006.01)
  *G01P 15/105* (2006.01)
  *G01V 7/04* (2006.01)

(52) U.S. Cl.
  CPC ............... *G01P 15/105* (2013.01); *G01V 7/04* (2013.01)
  USPC ..................................................... 73/504.12

(58) Field of Classification Search
  USPC ..................................................... 73/504.12
  See application file for complete search history.

(56) References Cited

U.S. PATENT DOCUMENTS

| 4,872,342 | A  | * | 10/1989 | Hanson et al. | 73/514.29 |
| 5,009,111 | A  | * | 4/1991  | West et al.   | 73/862.61 |
| 5,952,575 | A  | * | 9/1999  | Foote         | 73/514.21 |
| 6,631,643 | B2 | * | 10/2003 | Malvern et al.| 73/514.32 |
| 6,776,042 | B2 | * | 8/2004  | Pike et al.   | 73/514.32 |
| 2003/0010123 | A1 | * | 1/2003 | Malvern et al.| 73/514.32 |
| 2004/0027033 | A1 | * | 2/2004 | Schiller      | 310/329 |
| 2005/0195556 | A1 | * | 9/2005 | Shah          | 361/321.5 |
| 2005/0257616 | A1 | * | 11/2005 | Kozlov et al.| 73/514.16 |
| 2007/0204693 | A1 | * | 9/2007 | Chernyak et al.| 73/514.18 |

* cited by examiner

*Primary Examiner* — Hezron E Williams
*Assistant Examiner* — Mark A Shabman
(74) *Attorney, Agent, or Firm* — Ladas & Parry, LLP

(57) ABSTRACT

Disclosed herein is an inertial sensor. The inertial sensor includes a sensing unit and a driving-mass-position initialization module. The sensing unit includes a driving mass, a flexible board unit which displaceably supports the driving mass, and a support which supports the flexible board unit to allow the driving mass to move in a suspended state. The flexible board unit has driving electrodes which move the driving mass, and sensing electrodes which sense the movement of the driving mass. The driving-mass-position initialization module includes a position initialization member which reciprocates to initialize the position of the driving mass, and a coil unit which surrounds the position initialization member. An initialization-member-receiving depression is formed in the driving mass. The shape of the initialization-member-receiving depression corresponds to that of the position initialization member.

5 Claims, 4 Drawing Sheets

INERTIAL SENSOR

CROSS REFERENCE TO RELATED APPLICATION

This application claims the benefit of Korean Patent Application No. 10-2011-0138338, filed Dec. 20, 2011, entitled "INERTIAL SENSOR", which is hereby incorporated by reference in its entirety into this application.

BACKGROUND OF THE INVENTION

1. Technical Field

The present invention relates to an inertial sensor.

2. Description of the Related Art

Recently, MEMS (Micro-Electro-Mechanical Systems) technology has made it easy to manufacture small and light inertial sensors. This extends the range of application of inertial sensors to electric home appliances beyond the existing market. The functions of the inertial sensors are also continuously developing from single-axis sensors in which a single sensor can detect an inertial force with respect to a single axis, to multi-axis sensors in which a single sensor can detect inertial forces with respect to two or more multiple axes.

Piezoelectric elements are devices which are used to embody the inertial sensors and change in shape when a voltage is applied thereto and, conversely, generate a voltage when deformed. Due to these characteristics, the piezoelectric elements are widely used in a variety of actuators, sensors, etc. Further, there are different kinds of materials, for example, Aln, ZnO, quartz, etc., which can be used as the material of such a piezoelectric element. Particularly, PZT (Lead Zirconate Titanate) is widely used in a variety of fields, because its piezoelectric constant is comparatively large.

Methods of embodying inexpensive very small inertial sensors are mainly classified into a capacitive type and a piezoelectric type. Compared to the capacitive type, the piezoelectric type is advantageous in that normal pressure packaging is possible without making use of vacuum packaging.

Such an inertial sensor requires precise and effective time-sharing drive and control to embody it as a multi-axis inertial sensor, that is, a six-axis sensor that is associated with three-axis acceleration and three-axis angular velocity. In the case of an inertial sensor according to the conventional technique, sensing three-axis angular velocity using a single driving mass includes successively conducting X/Y-axial drive and Z-axial drive in a time-sharing manner, and successively sensing Z-axial angular velocity and X/Y-axial angular velocity.

As such, the piezoelectric type of inertial sensor embodies the driving and sensing at the same time so that it is possible to sense a static signal. However, it is impossible to sense a DC signal, that is, associated with the direction of gravity.

SUMMARY OF THE INVENTION

The present invention has been made in an effort to provide an inertial sensor and a method of sensing the direction of gravity using the inertial sensor, which includes a driving-mass-position initialization module that initializes the position of a driving mass, wherein when the inertial sensor is oriented in a direction other than the direction of gravity, the driving-mass-position initialization module initializes the position of the driving mass and then allows the driving mass to be moved and oriented in the direction of the gravity again, and the sensor senses the movement of the driving mass toward the direction of gravity, thus sensing the direction of gravity.

In an inertial sensor according to a first embodiment of the present invention, a sensing unit includes a driving mass, a flexible board unit and a support. The flexible board unit displaceably supports the driving mass. The flexible board unit has a driving electrode for moving the driving mass and a sensing electrode for sensing the movement of the driving mass. The support supports the flexible board unit to allow the driving mass to move in a suspended state. A driving-mass-position initialization module includes a position initialization member and a coil unit. The position initialization member reciprocates to initialize a position of the driving mass. The coil unit surrounds the position initialization member. The driving mass has an initialization-member-receiving depression having a shape corresponding to the position initialization member.

When a forward current is applied to the coil unit, the position initialization member may move and enter the initialization-member-receiving depression of the driving mass so that the position of the driving mass is initialized. When a backward current is applied to the coil unit, the position initialization member may be removed from the initialization-member-receiving depression of the driving mass so that the driving mass is moved and oriented in the direction of gravity, and the sensing electrode senses the movement of the driving mass toward the direction of gravity.

The sensing unit may further include a lower cap covering a lower portion of the driving mass. The lower cap may be coupled to the support.

In an inertial sensor according to a second embodiment of the present invention, a sensing unit includes a driving mass, a flexible board unit and a support. The flexible board unit displaceably supports the driving mass. The flexible board unit has a driving electrode for moving the driving mass and a sensing electrode for sensing the movement of the driving mass. The support supports the flexible board unit to allow the driving mass to move in a suspended state. A driving-mass-position initialization module includes a position initialization plate and a coil unit. The position initialization plate is attached to the driving mass and is made of an electromagnetic material. The coil unit is disposed facing the position initialization plate.

The sensing unit may further include a lower cap covering a lower portion of the driving mass. The lower cap may be coupled to the support. The coil unit may be disposed in the lower cap.

When a current is applied to the coil unit, the driving mass may be moved so that a lower surface of the driving mass becomes parallel to an upper surface of the lower cap. When the application of the current to the coil unit is interrupted, the driving mass may be moved and oriented in the direction of gravity, and the sensing electrode may sense the movement of the driving mass toward the direction of gravity.

In an inertial sensor according to a second embodiment of the present invention, a sensing unit includes a driving mass, a flexible board unit and a support. The driving mass is made of a magnetic body. The flexible board unit displaceably supports the driving mass. The flexible board unit has a driving electrode for moving the driving mass and a sensing electrode for sensing the movement of the driving mass. The support supports the flexible board unit to allow the driving mass to move in a suspended state. A driving-mass-position initialization unit includes a coil disposed in the support. The coil faces the driving mass.

The driving-mass-position initialization unit may be disposed and laminated in the support of the sensing unit by a same method as an MLCC (Multi-Layer Ceramic Capacitor) manufacturing method.

The sensing unit may further include a lower cap coupled to a lower end of the support to cover a lower portion of the driving mass.

A driving-mass-position initialization unit may be disposed in the lower cap. The driving-mass-position initialization unit may include a coil facing the driving mass.

When a current is applied to the coil, the driving mass may be moved so that a lower surface of the driving mass becomes parallel to an upper surface of the lower cap. When the application of the current to the coil is interrupted, the driving mass may be moved and oriented in the direction of gravity, and the sensing electrode may sense the movement of the driving mass toward the direction of gravity.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
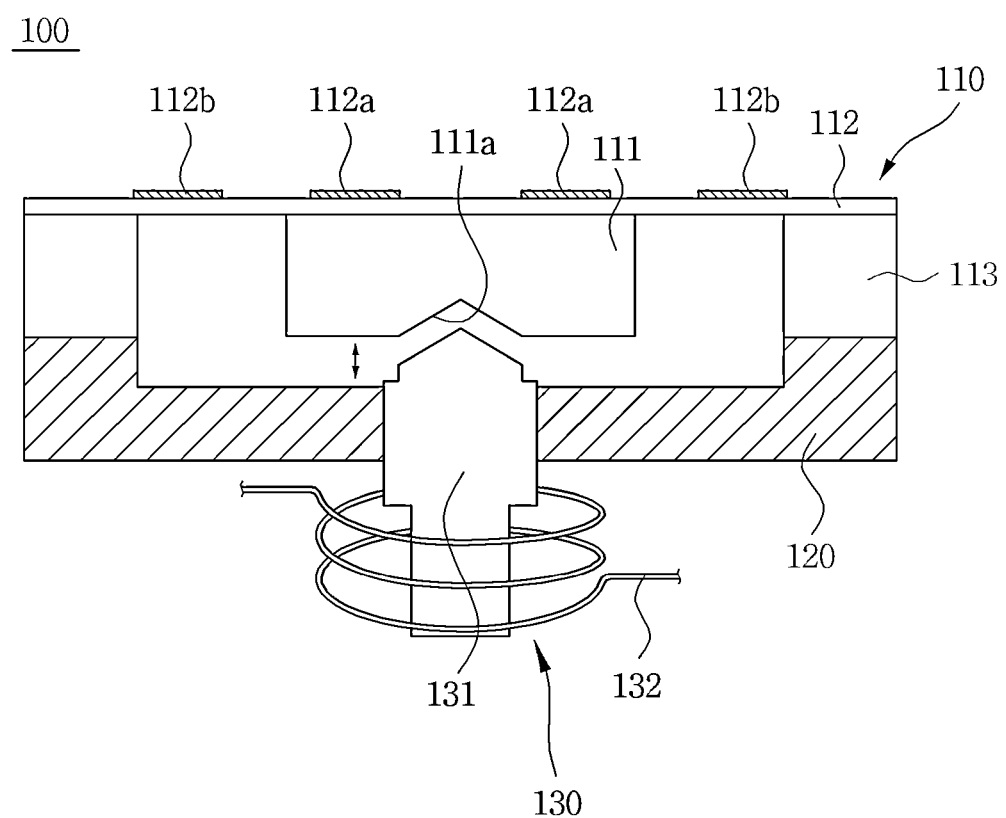
FIG. 1 is a schematic sectional view of an inertial sensor according to a first embodiment of the present invention.

Reference now should be made to the drawings, in which the same reference numerals are used throughout the different drawings to designate the same or similar components. If in the specification, detailed descriptions of well-known functions or configurations may unnecessarily make the gist of the present invention obscure, the detailed descriptions will be omitted. The terms and words used in the present specification and the accompanying claims should not be limitedly interpreted as having their common meanings or those found in dictionaries, but should be interpreted as having meanings adapted to the technical spirit of the present invention on the basis of the principle that an inventor can appropriately define the concepts of terms in order to best describe his or her invention.

Hereinafter, embodiments of an inertial sensor of the present invention will be described in detail with reference to the attached drawings.

FIG. 1 is a schematic sectional view of an inertial sensor 100 according to a first embodiment of the present invention. As shown in the drawing, the inertial sensor 100 includes a sensing unit 110, a lower cap 120 and a driving-mass-position initialization module 130.

In detail, the sensing unit 110 includes a driving mass 111, a flexible board unit 112 and a support 113.

The flexible board unit 112 displaceably supports the driving mass 111 and includes a flexible board, a piezoelectric material (PZT) and electrodes. The flexible board comprises a silicon or SOI (Silicon On Insulator) board. The piezoelectric element and the electrodes are deposited on the flexible board so that driving electrodes 112b for moving the driving mass 111 and sensing electrodes 112a for sensing the movement of the driving mass 111 are formed on the flexible board.

The driving mass 111 is displaceably disposed under the flexible board unit 112. The driving mass 111 moves when voltage is applied to the driving electrodes 112b of the flexible board unit 112.

An initialization-member-receiving depression 111a is formed in the driving mass 111 to allow the driving-mass-position initialization module 130 to initialize the position of the driving mass 111.

The support 113 supports the flexible board unit 112 to enable the driving mass 111 to easily move in a suspended state.

The driving mass 111 and the support 113 according to the present invention can be formed by etching a silicon board.

The lower cap 120 covers a lower portion of the driving mass 111 and protects the driving mass 111. Also, the lower cap 120 supports the sensing unit 110 and couples it to an ASIC (not shown).

If the inertial sensor is tilted with respect to the direction of gravity, the driving mass 111 is oriented in the direction of gravity and tilted with respect to the inertial sensor. Here, the driving-mass-position initialization module 130 functions to initialize the position of the driving mass 111 to the position when it is not in the tilted state, in other words, to the initial position. The driving-mass-position initialization module 130 includes a position initialization member 131 and a coil unit 132.

The position initialization member 131 enters the initialization-member-receiving depression 111a of the driving mass 111 and initializes the position of the driving mass 111 when the inertial sensor 100 is oriented in a direction other than the direction of gravity. In the position initialization member 131, the shape of a front end with respect to the movement direction corresponds to that of the initialization-member-receiving depression 111a of the driving mass 111.

The coil unit 132 functions to reciprocate the driving mass 111 and surrounds the position initialization member 131.

The inertial sensor 100 according to the first embodiment of the present invention may further include an upper cap (not shown) which protects an upper portion of the sensing unit 110.

In the inertial sensor 100 having the above-mentioned construction, when current is applied to the coil unit 132, electromagnetic force makes it possible for the position initialization member 131 to reciprocate with respect to the driving mass 111.

In detail, when forward current is applied to the coil unit 132, the position initialization member 131 is inserted into the initialization-member-receiving depression 111a of the driving mass 111 so that the driving mass 111 can be initialized.

On the other hand, when backward current is applied to the coil unit 132, the position initialization member 131 is removed from the initialization-member-receiving depression 111a of the driving mass 111 so that the driving mass 111 is moved and oriented in the direction of gravity again. Here, the sensing electrodes 112a of the sensing unit 110 sense the movement of the driving mass 111 toward the direction of gravity, thus sensing the direction of gravity.

Figure 2:
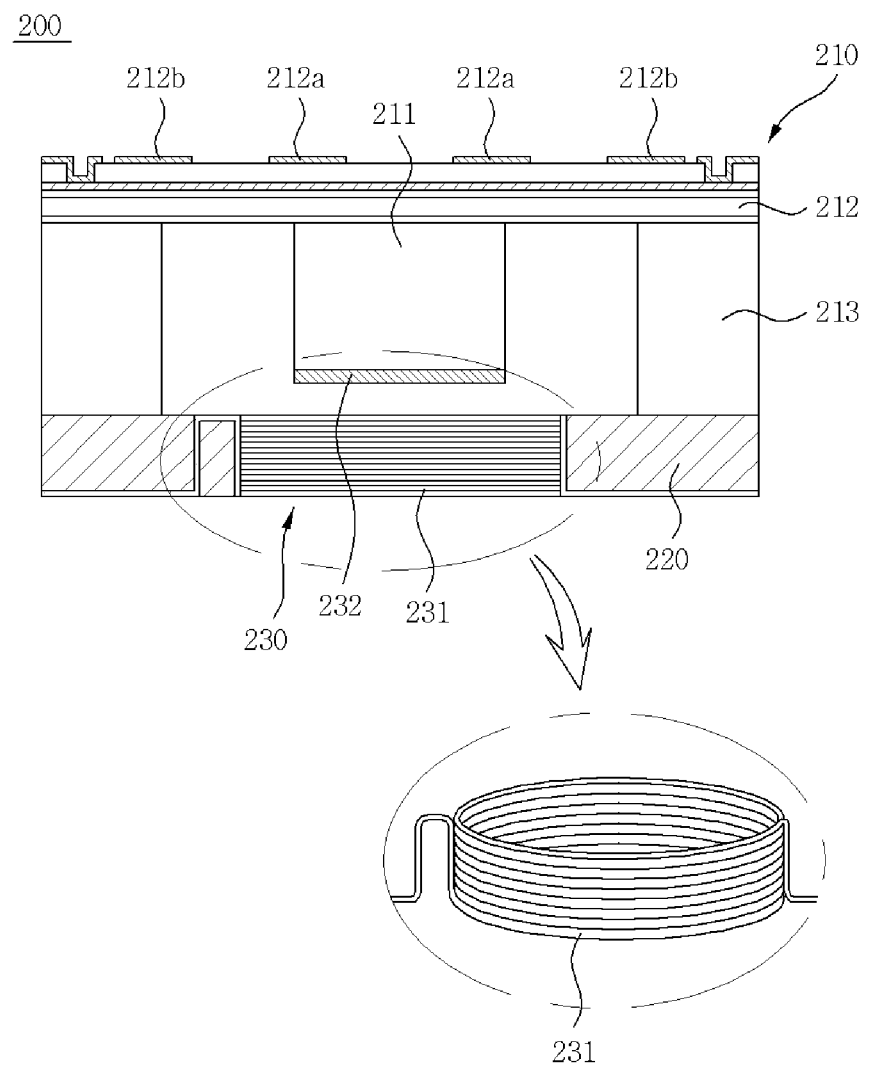
FIG. 2 is a schematic sectional view of an inertial sensor according to a second embodiment of the present invention.

FIG. 2 is a schematic sectional view of an inertial sensor 200 according to a second embodiment of the present invention. As shown in FIG. 2, the inertial sensor 200 includes a sensing unit 210, a lower cap 220 and a driving-mass-position initialization module 230.

In detail, the sensing unit 210 includes a driving mass 211, a flexible board unit 212 and a support 213. The flexible board unit 212 displaceably supports the driving mass 211, and includes driving electrodes 212b which move the driving mass 211 and sensing electrodes 212a which sense the movement of the driving mass 211.

The driving mass 211 is displaceably disposed under the flexible board unit 212. The driving mass 211 moves when voltage is applied to the driving electrodes 212b of the flexible board unit 212.

Furthermore, a position initialization plate 232 is attached to the driving mass 211 to allow the driving-mass-position initialization module 230 to initialize the position of the driving mass 211.

The support 213 supports the flexible board unit 212 to enable the driving mass 211 to easily move in a suspended state.

The driving mass 211 and the support 213 according to the present invention can be formed by etching a silicon board.

The lower cap 220 covers a lower portion of the driving mass 211 and protects the driving mass 211. Also the lower cap 220 supports the sensing unit 210 and couples it to an ASIC (not shown). The material of the lower cap 220 may be ceramic, for example, low temperature co-fired ceramic (LTCC), etc.

The driving-mass-position initialization module 230 includes a position initialization plate 232 and a coil unit 231.

The position initialization plate 232 generates electromagnetic force between it and the coil unit 231, and initializes the position of the driving mass 211 even when the inertial sensor 200 is oriented in a direction other than the direction of gravity. The position initialization plate 232 may be made of nickel or an electromagnetic material.

As stated above, the position initialization plate 232 is coupled to the driving mass 211, in detail, to a surface of the driving mass 211 that faces the lower cap 220.

The coil unit 231 functions to generate electromagnetic force between it and the position initialization plate 232 so that the driving mass 211 can be initialized by the electromagnetic force. The coil unit 231 is disposed in the lower cap 220. The reason for this is that in consideration of the initialized state of the driving mass 211 that is oriented parallel to the lower cap 220, after the driving mass 211 has moved towards the direction of gravity, the driving mass 211 can easily return to the position parallel to the lower cap 220, that is, to the initialized state.

Hereinafter, a method of measuring the direction of gravity using the inertial sensor 200 according to the second embodiment of the present invention will be described in detail.

Figure 3:
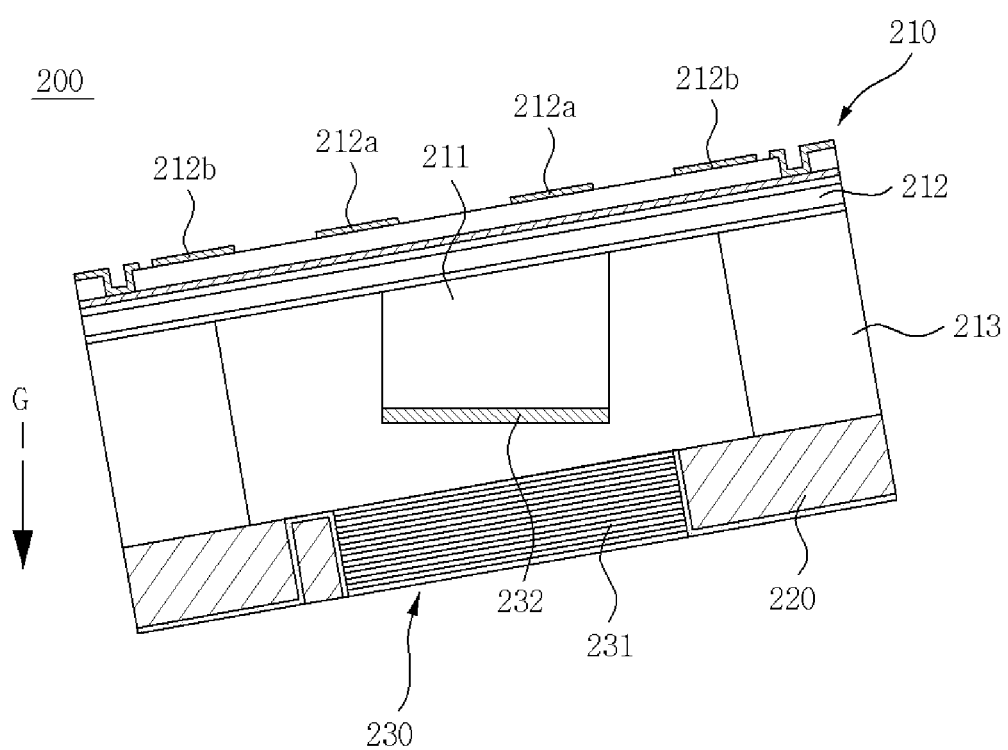
FIGS. 3 and 4 are schematic views illustrating measurement of the direction of gravity using the inertial sensor of FIG. 2.
Figure 4:
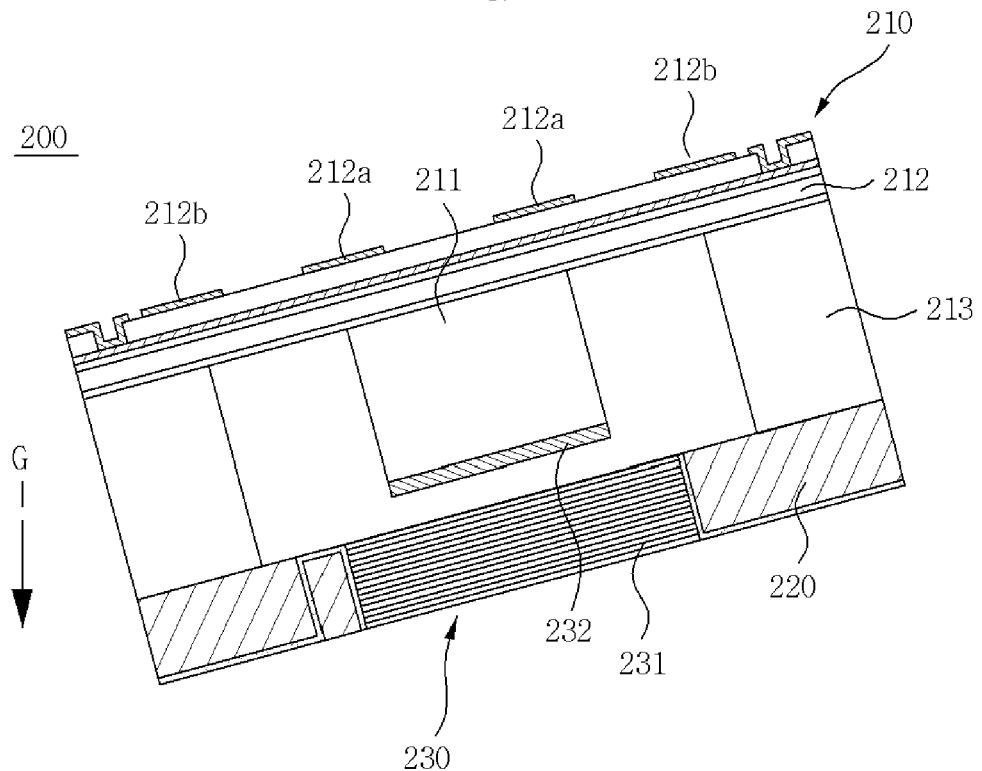

FIGS. 3 and 4 are schematic views illustrating the measurement of the direction of gravity using the inertial sensor 200 of FIG. 2. As shown in the drawings, when the inertial sensor 200 is tilted with respect to the gravity direction G designated by the arrow, the driving mass 211 is oriented in the gravity direction G but not in the direction of the initialized state.

When current is applied to the coil unit 231 of the driving-mass-position initialization module 230, an electromagnetic force, that is, an attractive force, is generated between the coil unit 231 and the position initialization plate 232 attached to the surface of the driving mass 211. Thereby, the driving mass 211 is moved to the initialized state that is parallel to the lower cap 220.

If the application of current to the coil unit 231 is interrupted, as shown in FIG. 3, the driving mass 211 is moved and oriented in the gravity direction G again. At this time, the sensing electrodes 212a of the sensing unit 210 sense the movement of the driving mass 211 toward the gravity direction G, thus sensing the gravity direction G.

Figure 5:
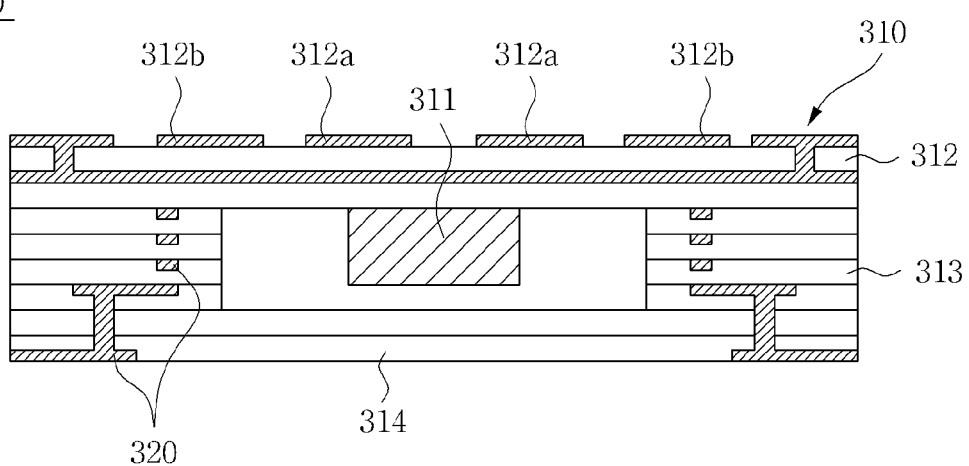
FIG. 5 is a schematic sectional view of an inertial sensor, according to a third embodiment of the present invention.

FIG. 5 is a schematic sectional view of an inertial sensor 300 according to a third embodiment of the present invention. As shown in FIG. 5, the inertial sensor 300 includes a sensing unit 310 and a driving-mass-position initialization unit 320.

In detail, the sensing unit 310 includes a driving mass 311, a flexible board unit 312, a support 313 and a lower cap unit 314.

The flexible board unit 312 displaceably supports the driving mass 311 and includes driving electrodes 312b which move the driving mass 311, and sensing electrodes 312a which sense the movement of the driving mass 311.

The driving mass 311 is displaceably disposed under the flexible board unit 312. The driving mass 311 moves when voltage is applied to the driving electrodes 312b of the flexible board unit 312.

The driving mass 311 comprises a magnetic body which can be moved by an electromagnetic force generated between it and the driving-mass-position initialization unit 320.

The support 313 supports the flexible board unit 312 to enable the driving mass 311 to easily move in a suspended state.

The lower cap unit 314 covers a lower portion of the driving mass 311 and protects the driving mass 311. Also, the lower cap unit 314 supports the sensing unit 310 and couples it to an ASIC (not shown).

The driving-mass-position initialization unit 320 comprises a coil, and is coupled to the support 313 and the lower cap unit 314 so that it is disposed around the driving mass 311.

Further, the sensing unit 310 and the driving-mass-position initialization unit 320 of the inertial sensor 300 according to the third embodiment of the present invention are manufactured by the same method as an MLCC (Multi-Layer Ceramic Capacitor) manufacturing method using a lamination process. Those skilled in this art will be able to easily embody this.

In the third embodiment having the above-mentioned construction, when current is applied to the coil that is the driving-mass-position initialization unit 320, an electromagnetic force is generated between the driving mass 311 and the coil so that the position of the driving mass 311 is initialized by the electromagnetic force.

When interrupting the application of current to the coil that is the driving-mass-position initialization unit 320, the driving mass 311 is moved and oriented in the gravity direction again. Here, the sensing electrodes 312a of the sensing unit 310 sense the movement of the driving mass 311 toward the gravity direction, thus sensing the gravity direction.

As described above, the present invention provides an inertial sensor and a method of sensing the direction of gravity using the inertial sensor, which includes a driving-mass-position initialization module that can initialize the position of a driving mass. When the inertial sensor is oriented in a direction other than the direction of gravity, the driving-mass-position initialization module initializes the position of the driving mass and then allows the driving mass to be moved and oriented in the direction of gravity again. At this time, the direction of gravity can be sensed by sensing the movement of the driving mass toward the direction of gravity.

Although the embodiments of the present invention have been disclosed for illustrative purposes, it will be appreciated that the inertial sensor according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An inertial sensor, comprising:
a sensing unit comprising:
a driving mass made of a magnetic body;
a flexible board unit displaceably supporting the driving mass, the flexible board unit having a driving electrode for moving the driving mass and a sensing electrode for sensing the movement of the driving mass; and
a support supporting the flexible board unit to allow the driving mass to move in a suspended state; and
a driving-mass-position initialization unit comprising a coil disposed in the support, the coil facing the driving mass,
wherein when a current is applied to the coil, the driving mass is moved so that the driving-mass-position is initialized, when the application of the current to the coil is interrupted, the driving mass is moved and oriented in a direction of gravity, and the sensing electrode senses the movement of the driving mass toward the direction of gravity.

2. The inertial sensor as set forth in claim 1, wherein the driving-mass-position initialization to unit is disposed and laminated in the support of the sensing unit by a same method as an MLCC (Multi-Layer Ceramic Capacitor) manufacturing method.

3. The inertial sensor as set forth in claim 1, wherein the sensing unit further comprises a lower cap coupled to a lower end of the support to cover a lower portion of the driving mass.

4. The inertial sensor as set forth in claim 3, wherein a driving-mass-position initialization unit is disposed in the lower cap, the driving-mass-position initialization unit comprising a coil facing the driving mass.

5. The inertial sensor as set forth in claim 3, wherein when a current is applied to the coil, the driving mass is moved so that a lower surface of the driving mass becomes parallel to an upper surface of the lower cap.

* * * * *